United States Patent [19]
Tabachenko et al.

[11] Patent Number: 5,842,705
[45] Date of Patent: Dec. 1, 1998

[54] QUICK-CHANGE JAW ASSEMBLY

[75] Inventors: Oleg Tabachenko, Fairlawn, N.J.; Fernand U. Boisse, Bristol, Conn.

[73] Assignee: The Goss & DeLeeuw Machine Company, Kensington, Conn.

[21] Appl. No.: 976,773

[22] Filed: Nov. 24, 1997

[51] Int. Cl.$^6$ .................................................. B23B 31/16
[52] U.S. Cl. ........................................ 279/124; 279/153
[58] Field of Search .................................. 279/123, 110, 279/124, 152, 153

[56] References Cited

U.S. PATENT DOCUMENTS

| | | | |
|---|---|---|---|
| 1,372,726 | 3/1921 | Sloan | 279/124 |
| 3,868,120 | 2/1975 | Blattry et al. | 279/123 |
| 4,029,325 | 6/1977 | Rohm | 279/123 |
| 4,668,971 | 5/1987 | Norton et al. | 279/121 |
| 4,763,906 | 8/1988 | Barbieux | 279/123 |
| 4,982,970 | 1/1991 | Otani et al. | 279/123 |
| 5,015,003 | 5/1991 | Ramunas | 279/123 |

Primary Examiner—Steven C. Bishop
Attorney, Agent, or Firm—McCormick, Paulding & Huber

[57] ABSTRACT

A rotary chuck having a plurality of quick change jaw assemblies each including a master jaw carried by the chuck body and a top jaw releasably secured to the master jaw by a single retaining fastener having a shank including a frustoconical portion. A resilient roll pin carried by the top jaw bears upon and is compressed by the frustoconical portion. The compressed roll pin exerts a resilient biasing force which acts upon the top jaw to continuously urge an arcuate reference surface on the top jaw into coengagement with a complementary reference surface on the master jaw. A hardened locking pin carried by the jaw assembly bears against a frustoconical head on a locking fastener threadably engaged with the master jaw to prevent relaxation of the resilient biasing force provided by the roll pin when the jaws clampingly engage the I.D. of a tubular workpiece.

32 Claims, 6 Drawing Sheets

QUICK-CHANGE JAW ASSEMBLY

FIELD OF INVENTION

This invention relates in general to jaw assemblies for machine tools and deals more particularly with improvements in quick-change jaw assemblies of the type particularly adapted for use in chucks for high speed production machines.

BACKGROUND OF THE INVENTION

Quick-change jaw assemblies of the type with which the present invention is concerned are typically used in chucks for rotary machine tools. Such a chuck jaw assembly typically includes a radially displaceable master jaw mounted on the chuck body and a top jaw releasably secured to the master jaw to facilitate rapid jaw change. The top jaw provides a clamping or gripping surface adapted to engage a workpiece at either its outside or inside diameter and to hold the workpiece during a machining operation. Normally, the gripping or clamping surfaces on the top jaws are machined after the top jaws have been mounted on the master jaws to assure concentricity of the clamping surfaces relative to the axis of rotation of the chuck.

Chucks having jaws of the aforedescribed quick-change type are particularly well suited for use in repetitive small batch production operations where frequent changeover is required. At the end of each production run it is usually necessary to remove the top jaws from the chuck and replace them with another set of top jaws particularly adapted to accommodate the next workpiece which may be of a substantially different size or configuration. Precise concentricity of the jaw clamping surfaces must be maintained to achieve close tolerance workholding. Desired close tolerances can be maintained by remachining the top jaws after changeover. However, the remachining process is costly and time consuming.

Another approach to the maintenance of precise concentricity after jaw changeover requires that the top jaws and master jaws be marked and maintained as matched pairs for subsequent use. While this practice is advisable with all chucks, including the present ones, this approach introduces the possibility of human error and makes it impossible to interchange top jaws from one chuck to another. If proper matching is not maintained clamping surface concentricity may be lost and any spindle runout condition which may have existed in the initial jaw setup will be compounded in a subsequent mismatched jaw setup.

Heretofore, various jaw assemblies have been available which provide interchangability among top jaws so that the top jaws may be randomly assembled with the master jaws on a chuck without remachining while still maintaining concentricity. However, such jaw assemblies generally employ complex mounting mechanism and are usually costly to produce. Further, such interchangeable jaw assemblies often employ spring biasing mechanisms for urging reference surfaces on the master and top jaws into coengagement and often fail to provide the degree of reliability and chucking concentricity desired.

Accordingly, it is the general aim of the present invention to provide an improved interchangeable type quick-change jaw assembly of simple durable construction wherein a single fastener which releasably secures a top jaw to a master jaw also functions to provide a positive sustained biasing force of substantial magnitude for urging reference surfaces on the jaws into and maintaining the surfaces in coengagement to assure precise top jaw and master jaw alignment.

SUMMARY OF THE INVENTION

In accordance with the present invention a quick change jaw assembly includes a master jaw and a top jaw having coengaging reference surfaces and retaining means for releasably securing the jaws in assembled relation to each other and continuously exerting resilient biasing force on one of the jaws urging the reference surfaces toward and into coengagement with each other. The retaining means includes a jaw retaining fastener having an axially elongated shank and an axially elongated resilient pin carried by one of the jaws and engaged with an associated portion of the retaining fastener shank.

DETAILED DESCRIPTION OF PREFERRED EMBODIMENTS

Turning now to the drawings and referring first particularly to FIGS. 1–4, a power actuated three jaw chuck indicated generally at 10 has quick-change jaw assemblies embodying the present invention and designated generally by the numerals 12, 12. The illustrated chuck 10 may be suitable for use in any machine tool which requires a rotary or stationary chuck, but is particularly adapted for use in a high production machine tool and may be arranged to clamp and hold a workpiece (not shown) at either its outside diameter (O.D.) or its inside diameter (I.D.). However, as shown in the drawings, the jaw assemblies 12, 12 are bored for O.D. chucking. The chuck 10 includes a hollow generally cylindrical chuck body, indicated at 13, which contains a jaw actuating mechanism (not shown) and has a central axis of rotation designated by the letter A in FIG. 3. Each jaw assembly 12 includes a master jaw, indicated generally at 14, supported by the chuck body 13 for radial movement generally toward and away from the axis of rotation A, and a top jaw, releasably secured to the master jaw 14, and designated generally by the numeral 16. In accordance with the present invention, the top jaws are interchangeably mounted on the master jaws, so that any one of the top jaws 16, 16 may be mounted on any one of the master jaws 14, 14 without loss of chucking concentricity, all of which will be hereinafter more fully discussed.

Figure 8:
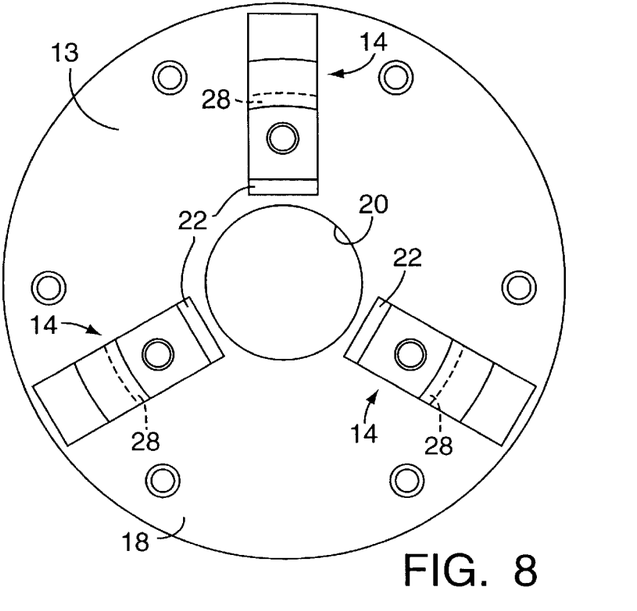
FIG. 8 is a front elevational view of the chuck shown with the top jaws removed.

Considering now the chuck assembly 10 in further detail, the cylindrical chuck body 13 has a radially disposed front wall 18 and a coaxial cylindrical central bore 20 which opens through the front wall. Three equiangularly spaced generally rectangular openings 22, 22, are formed in the chuck body 13, communicate with the interior of the chuck body, and open axially outwardly through the front wall 18, as best shown in FIG. 8. Each master jaw 14 is received and supported within an associated one of the openings 22, 22, complements at least a portion of the opening, and is arranged for limited sliding movement in a radial direction within the opening and relative to the chuck body 13 generally toward and away from the chuck central axis A. A power operated jaw actuating mechanism (not shown) contained within the chuck body 13 operates the chuck 10 to move the three master jaws 14, 14 in unison and in a radially direction either toward or away from the central axis A to clamp and hold a workpiece at either its O.D. or its I.D., as required. The chuck 10 jaw actuating mechanism is preferably power operated and may, for example, be hydraulically or pneumatically powered. Such power operated chuck jaw actuating mechanisms are well known in the chucking art. However, it is contemplated that the quick-change jaw assemblies of the present invention may be employed in a wide variety of chuck applications of either power or manually operated type and it is for this reason that the particular actuating mechanism for operating the jaw assemblies 12, 12 is not shown. An understanding of the jaw actuating mechanism is not essential to an understanding of the present invention.

Figure 1:
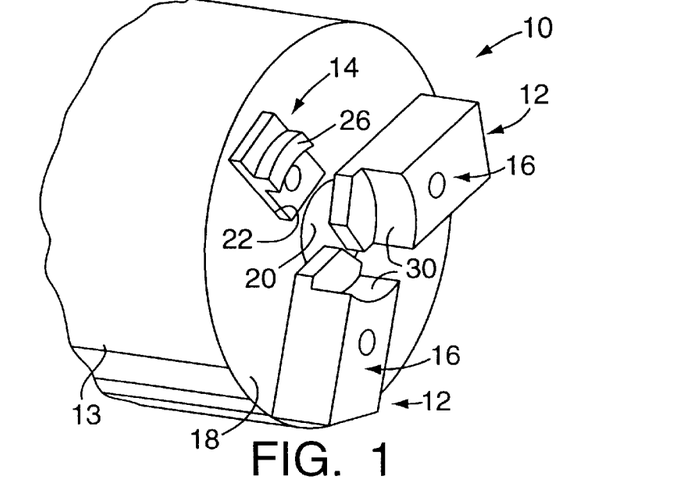
FIG. 1 is a fragmentary perspective view of a machine tool chuck having jaw assemblies embodying the present invention and shown with a top jaw removed.
Figure 2:
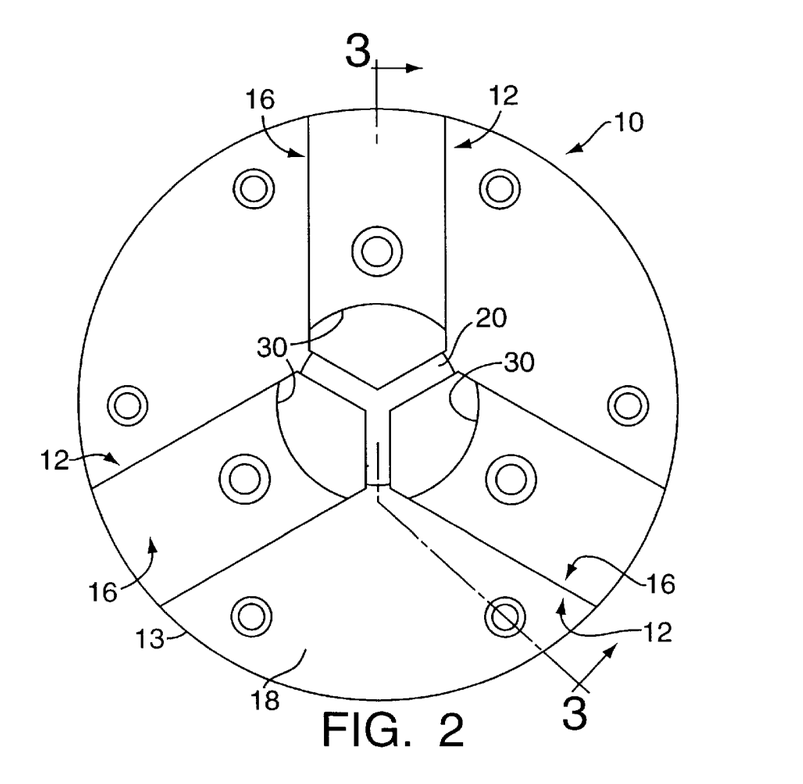
FIG. 2 is a somewhat enlarged front elevational view of the chuck.
Figures 3, 4, 5, 6:
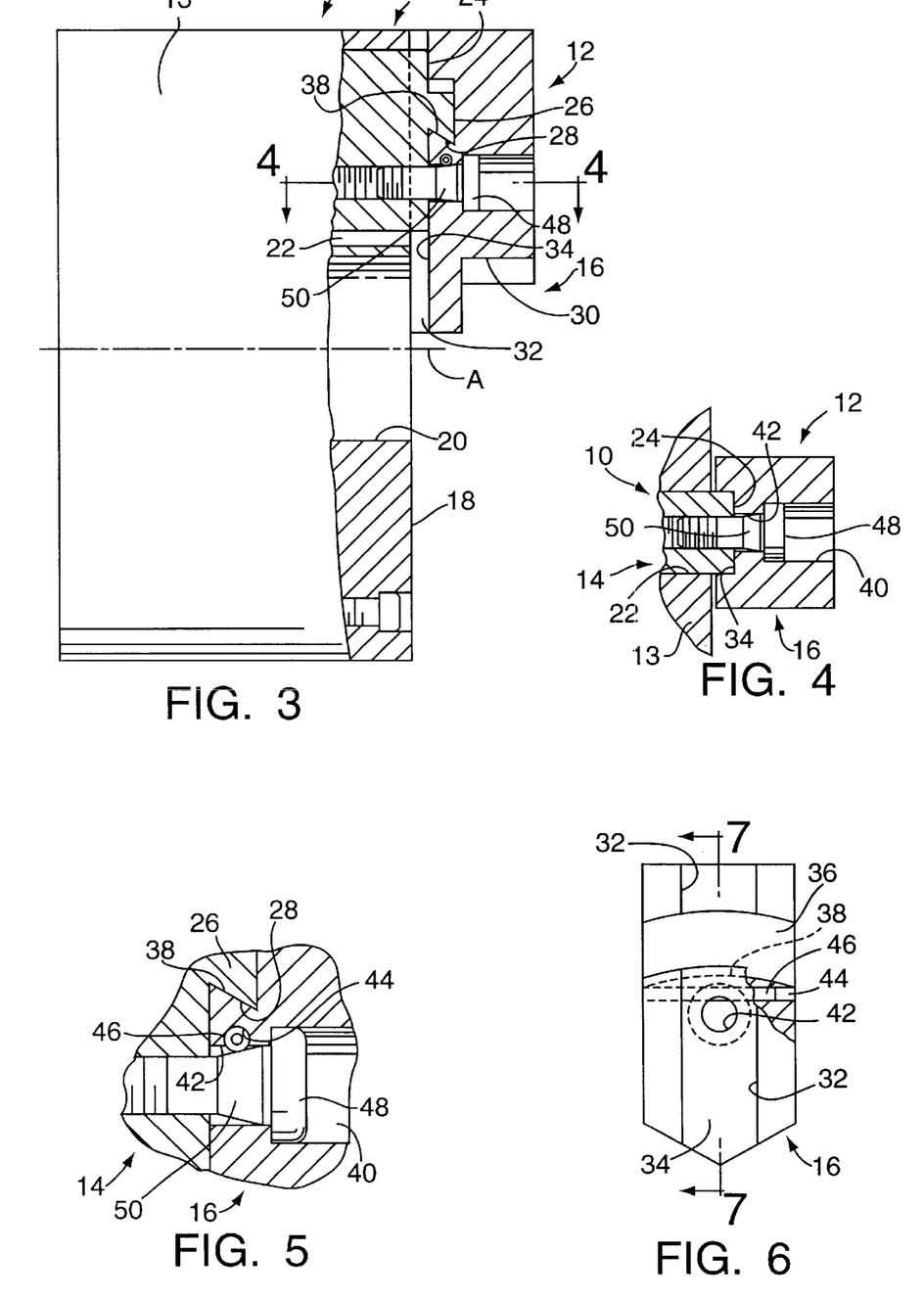
FIG. 3 is a side elevational view of the chuck shown partially in section taken generally along the line 3—3 of FIG. 2.
FIG. 4 is a fragmentary sectional view taken along the line 4—4 of FIG. 3.
FIG. 5 is a somewhat further enlarged fragmentary sectional view of the chuck as shown in FIG. 3.
FIG. 6 is a rear elevational view of a top jaw shown with a roll pin positioned therein.
Figure 7:
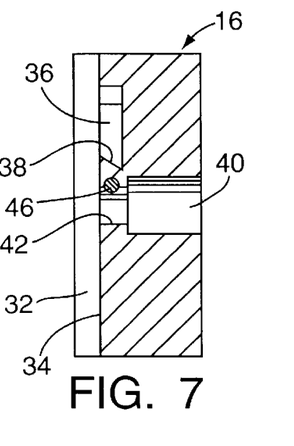
FIG. 7 is a sectional view taken along the line 7—7 of FIG. 6.

As best shown in FIGS. 3 and 4, the illustrated master jaw 14 projects forwardly for some distance from and beyond the opening 22 and has a radially disposed and forwardly facing abutment surface 24 which is spaced some distance forwardly of the front wall 18. An integral boss 26 projects forwardly from the abutment surface 24 as shown in FIG. 3 and has a radially inwardly facing arcuate reference surface 28. The reference surface 28 is defined by a forwardly converging conical surface of revolution having an axis of revolution concentric with the chuck body axis A. The conical reference surfaces 28, 28 on the master jaws 14, 14 are simultaneously formed by a turning operation which is performed after the master jaws 14, 14 have been assembled with the chuck body 13, for a purpose which will be hereinafter further evident. In FIG. 8 the chuck body 13 is shown with the master jaws 14, 14 in place after the concentric conical reference surfaces 28, 28 have been formed on the master jaws.

A typical top jaw 16, best shown in FIGS. 3–6, essentially comprises a radially elongated generally rectangular block having an arcuate radially inwardly facing clamping surface 30 formed at its radially inner end for engaging the O.D. of a workpiece to be chucked. A rearwardly open radially extending slot 32 formed in a rear portion of the top jaw 16 is partially defined by a rearwardly facing seating surface 34. The slot 32 receives and complements at least a portion of a forwardly projecting portion of a master jaw 14. Thus, the slotted top jaw 16 substantially straddles an associated portion of the master jaw 14 and is thereby maintained in a predetermined portion of radial alignment with the master jaw upon which it is mounted. A rearwardly open arcuate slot 36 formed in the top jaw and sized to receive the boss 26 on a master jaw is partially defined by an arcuate forwardly converging conical reference surface 38 adapted for complementary coengagement with the conical reference surface 28 on the boss 26, as best shown in FIGS. 3 and 5.

Referring now particularly to FIG. 5, a stepped cylindrical fastener receiving bore 40 extends through the top jaw 16 in axially normal relation to the rear surface 34 and has a reduced diameter rear end portion 42. A pin bore 44, extends transversely through the top jaw in intersecting relation to the reduced diameter bore portion 42. A resilient member or pin 46 is received within the bore 44, substantially as shown a roll pin being presently preferred. The top jaw 16 is positioned on the master jaw 14 and secured to the master jaw by a single threaded fastener 48. A frustoconical forwardly diverging shank portion of the fastener, indicated at 50, bears against and exerts radially outwardly directed compressive force upon the resilient roll pin 46 as the fastener 48 is tightened to secure the top jaw 16 to the master jaw 14. The resilient roll pin 46, in turn, exerts sustained radially outwardly directed resilient biasing force upon the top jaw 16 thereby continuously urging the radially outwardly facing conical reference surface 38 on the top jaw 16 into coengagement with the complementary radially inwardly facing conical reference surface 28 on the master jaw 14.

The resulting wedging action which occurs between the coengaging conical reference surfaces 28 and 38 seats the top jaw on the master jaw with the seating surface 34 in engagement with the abutment surface 24, thereby assuring precise positioning and alignment of the top jaw 16 with the master jaw 14. The coengaging abutment and surfaces 24 and 34, defined by the master jaw and the top jaw, cooperate to limit axial movement of the top jaw toward the master jaw in response to the aforedescribed wedging action. The straddling arrangement of the top jaw relative to the master jaw, provided by the slot 34, maintains the two jaw members 14 and 16 in a predetermined position of radial alignment with each other and enables the top jaw 16 to be secured to the master jaw 14 by a single threaded fastener. Thus, the single fastener 48 not only secures the top jaw 16 to the master jaw 14, but also applied a compressive force to the roll pin to produce a reactive force in the resilient roll pin area causing the roll pin to continuously resiliently bias the coengaging reference surfaces 28 and 38 on the two jaw member 14 and 16 toward coengagement with each other. After each top jaw 16 has been assembled with an associated master jaw 14, the chuck assembly 10 is rotated about its central axis A and the chucking or workpiece clamping surfaces 30, 30 are formed on the top jaws 16, 16 by a boring operation to assure precise concentricity of the clamping surfaces relative to the chuck central axis A.

Since both the reference surfaces 28, 28 and the chucking or gripping surfaces 30, 30 are formed with respective jaw members in position on the chuck body 13, as previously discussed, it will now be evident that the top jaws 16, 16 are interchangeable—that is any one of the top jaws 16, 16 may be assembled on any one of the master jaws 14, 14 without loss of chucking concentricity. The employment of a resilient member or roll pin 46 which cooperates in abutting engagement with a threaded jaw retaining fastener 48 enables the sustained application of substantial biasing force to continuously urge the opposing reference surfaces on the master and top jaws into coengagement with each other for precise jaw positioning and continued maintenance of such positioning. In this manner, repeatability is assured when the top jaws are removed from and later reassembled with the master jaws.

When the chuck 10 is operated to move the jaw assemblies 12, 12 radially inwardly and into clamping engagement with the O.D. of a workpiece (not shown) all of the forces applied to the system to clamp the workpiece also act to provide reactive force for urging the references surfaces into coengagement with each other when the jaw assemblies are brought into clamping engagement with the O.D. of a workpiece.

In the description of further embodiments of the invention which follows, parts identical to parts previously described bear the same reference numerals as the previously described parts and a letter suffix and will not be further described in detail.

Figure 9:
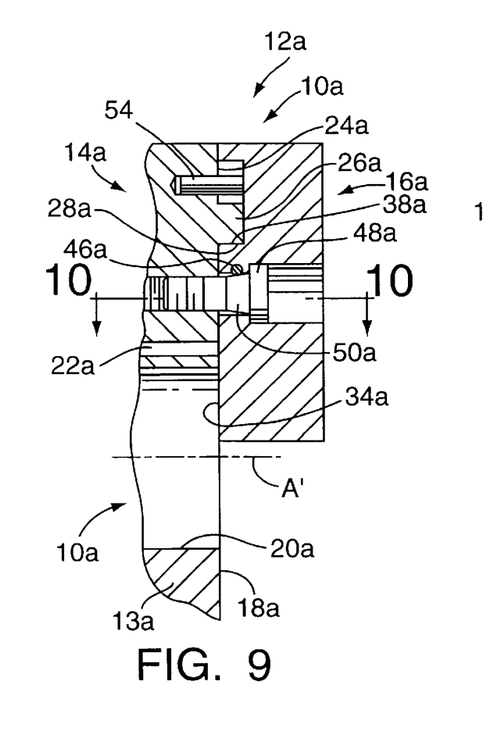
FIG. 9 is a fragmentary sectional view similar to FIG. 3 but shows another embodiment of the invention.
Figure 10:
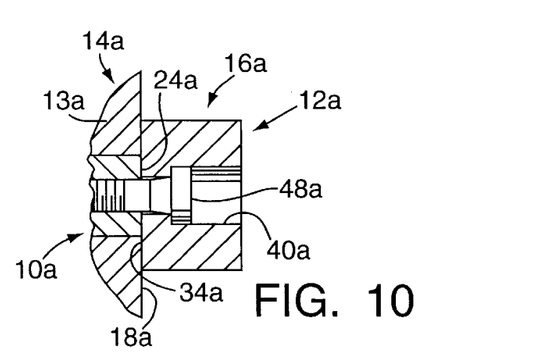
FIG. 10 is a fragmentary sectional view taken along the line 10—10 of FIG. 9.
Figure 11:
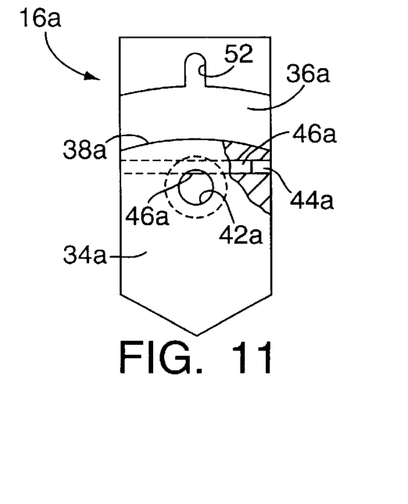
FIG. 11 is a rear elevational view of the top jaw shown in FIGS. 9 and 10.

In some instances a chuck with which the present invention may be practiced may have master jaws with forwardly facing surfaces substantially flush with or lying in substantially the same radial plane as the radially disposed frontal surface of the chuck body. Such a chuck assembly is shown in FIGS. 9–11 and indicated by the reference numeral 10a. It will be noted that the radially disposed and forwardly facing abutment surface 24a on the illustrated master jaw 14a does not extend an appreciable distance forward of the radially disposed and forwardly facing chuck body frontal surface 18a. It should be further noted that the boss 26a on the master jaw 14a defines a generally cylindrical reference surface 28a centered on the axis of rotation A' of the chuck body 13a as shown in FIG. 9. The illustrated top jaw 16a differs from the top jaw 16, previously described, in that its reference surface 38a is defined by a cylindrical surface which complements the cylindrical reference surface 28a on the master jaw 14a.

The top jaw 16a further differs from the previously described top jaw 16 in that it does not include a rearwardly open slot corresponding to the previously described slot 32 and does not straddle the master jaw on which it is mounted. Instead, the arcuate slot 36a in the top jaw 16a, which receives the boss 26a on the master jaw, opens directly through the rearwardly facing seating surface 34a.

A radially inwardly open slot 52 opens into the arcuate slot 36a and receives a dowel pin 54 which is mounted on and projects forwardly from the master jaw 14a in axially normal relation to the abutment surface 24a. The dowel pin 54 and the slot 52 in which it is received cooperate with the single fastener 48a to maintain the top jaw 16a in predetermined position of radial alignment with the master jaw 14a when the two jaw members are secured in assembly with each other by the latter fastener, thereby enabling the single threaded fastener 48a to both secure the top jaw 16a to the master jaw 14a and apply compressive force to the roll pin 46a to produce resilient reactive force within the roll pin 46a. This reactive force continuously urges the reference surface 38a on the top jaw 16a toward and into coengagement with the opposing reference surface 28a on the master jaw 14a to precisely align and maintain the top and master jaws as hereinbefore discussed.

Figure 12:
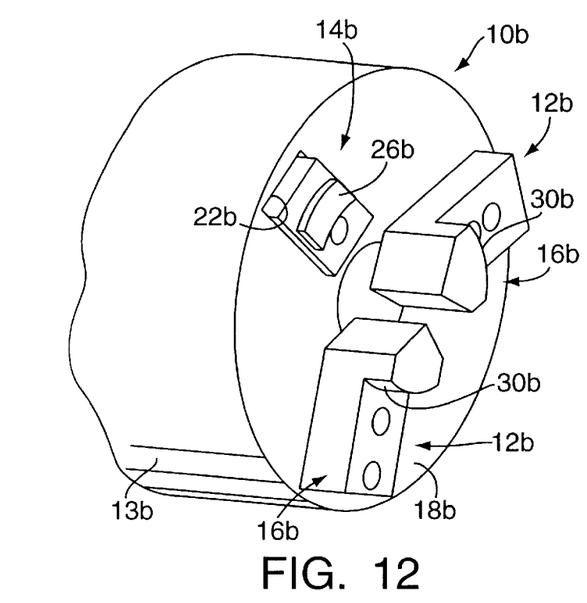
FIG. 12 is a fragmentary perspective view of another chuck embodying the present invention shown with a top jaw removed.
Figure 13:
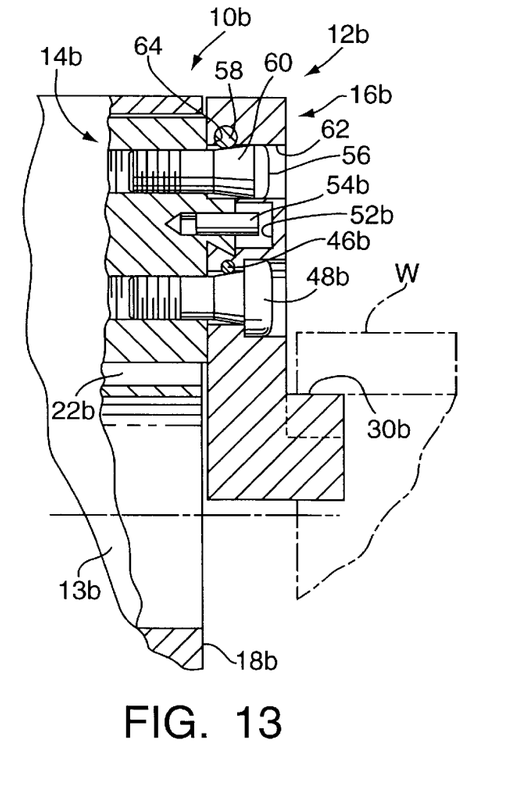
FIG. 13 is a somewhat enlarged fragmentary side elevational view of the chuck of FIG. 12 shown with one of the jaw assemblies in partial axial section.

Referring now to FIGS. 12 and 13 another chuck indicated generally at 10b has jaw assemblies 12b, 12b which illustrate a further embodiment of the invention. The illustrated chuck 10b is particularly adapted to clamp a cylindrical tubular workpiece at its I.D. and a typical jaw assembly 12b is shown in FIG. 13 in clamping engagement with a workpiece. The workpiece is shown phantom and indicated by the letter W. The jaw assembly 12b, as shown in FIG. 13, includes a master jaw 14b and a top jaw 16b. The top jaw is releasably secured to the master jaw by a single threaded retaining fastener 48b, which cooperates with a resilient roll pin 46b to continuously bias complementary reference surfaces on the top and master jaw members into coengagement in the manner hereinbefore described. The jaw assembly 12b further includes a dowel pin 54b carried by the master jaw and received within a rearwardly open slot 52b formed in the top jaw 16b for cooperating with the single retaining fastener 48b to maintain the top jaw 16b in a precise predetermined position of radial alignment with the master jaw 14b.

Unlike the previously described embodiments, the jaw assembly 12b also includes a threaded locking member 56 and a hardened locking pin 58 which cooperates with the locking member for a purpose which will be hereinafter further evident. The locking member 56 has an elongated shank which includes a frustoconical head portion 60 and extends through a generally cylindrical locking member bore 62 in the top jaw 16b and is threadably engaged with the master jaw 14b, substantially as shown in FIG. 13. The hardened locking pin 58 is received within a locking pin bore 64 formed in the top jaw 16b radially outwardly of the locking member bore 62. The locking pin bore 64 extends transversely of and intersects or opens into the locking member bore 62, substantially as shown. The hardened locking pin 58 and at least the head portion 60 of the locking member 56 are harder than the material from which the top jaw 16 is made.

As in the previously described jaw assemblies, the assemblies 12b are prepared for use with the chuck 10b by first machining the reference surfaces on the master jaws 14b, 14b with the master jaws in position on the rotating chuck. The top jaws 16b, 16b are then assembled on the master jaws after which the clamping surfaces 30b, 30b, are machined with the top jaws in position on the chuck. This procedure assures precise concentricity and interchangeability of the top jaws as has been previously discussed.

Since the jaw assemblies 12b, 12b shown in FIG. 12 are particularly adapted to clamp the I.D. of a workpiece, such as the illustrated workpiece W, it will be apparent that the jaw assemblies 12b, 12b must move radially outwardly and away from the central axis of the rotation of the chuck to clampingly engage the workpiece at its I.D. When the clamping surfaces 30b, 30b on the top jaws clampingly engage the I.D. of an associated workpiece further movement of the top jaws in a radially outwardly direction is arrested by engagement of the clamping surfaces 30b, 30b with the interior surface of the workpiece. However, the force applied to the top jaws 16b, 16b by the power actuated master jaws 14b, 14b continues to act in a radially outward direction so that each master jaw tends to move away or separate from the arrested top jaw which it carries. Thus, the forces acting on the system to clamp the workpiece also tend to relax the compressive force initially applied to the roll pin 46b by the retaining fastener 48b and thereby reduce the resilient energy stored in the roll pin. The locking member 56 and the locking pin 58 are provided to overcome this problem.

After the top jaws 16b, 16b have been secured to the master jaws 14b, 14b and before the clamping surfaces 30b, 30b are brought into clamping engagement with a workpiece each locking member 56 is threadably tightened to position its head 60 in abutting with an associated hardened locking pin 58. The locking members and locking pins cooperate to effectively prevent radially outward movement of the master jaws relative to the top jaws and thereby prevent relaxation of the roll pins 46b, 46b which are maintained under compression and tend to continuously bias the reference surfaces on the jaw assemblies toward coengagement with each other.

The dowel pin 54b is provided to facilitate rapid positioning of the top jaw 16b on the master jaw 14b. The locking member 56 is not employed as an alignment device, because it is not positioned relative to the jaws until after the jaws have been assembled and secured by the threaded fastener 48b which also compresses the resilient roll pin 46b.

Figure 14:
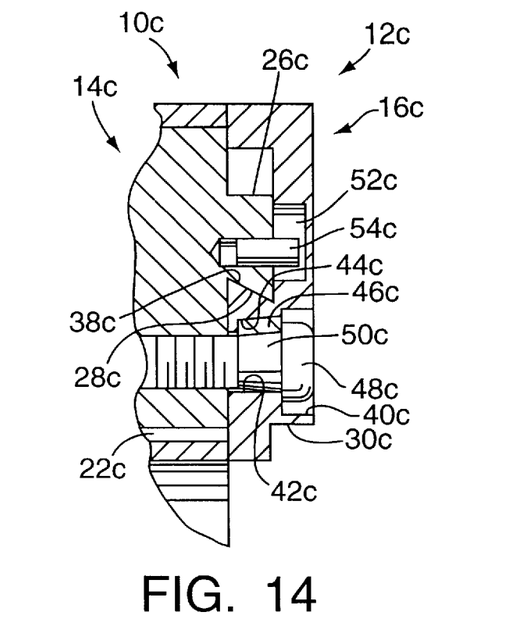
FIG. 14 is similar to FIG. 13 but shows another embodiment of the invention.
Figure 15:
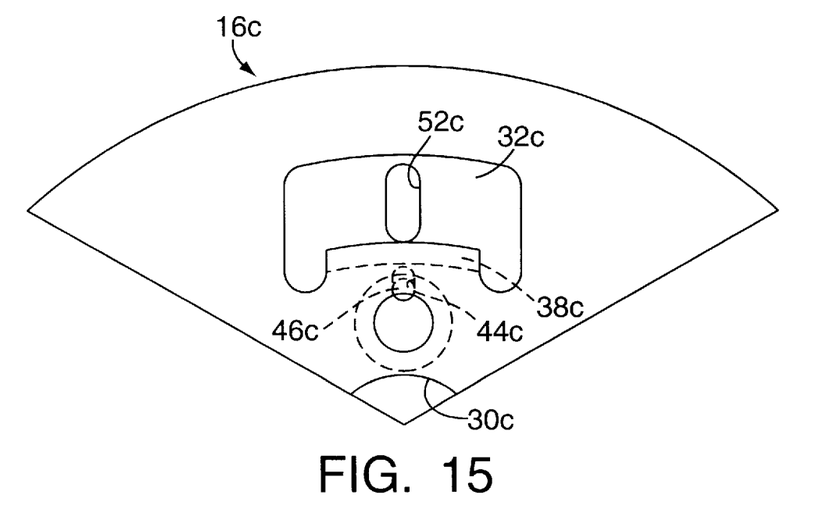
FIG. 15 is a rear elevational view of the top jaw shown in FIG. 14.

In FIGS. 14 and 15 another jaw assembly embodying the present invention and indicated generally at 12c is shown mounted on a rotary chuck 10c. The jaw assembly 12c includes a master jaw 14c similar in many respects to the master jaw 14b, previously described, and carries a projecting dowel pin 54c.

The illustrated top jaw 16c has an arcuate configuration and generally resembles a pie slice, as it appears in FIG. 15. An arcuate recess 32c opens through the rear surface of the top jaw and is partially defined by an arcuate reference surface 38c formed by a conical surface of revolution having an axis coincident with the axis of rotation of the chuck 10c. A slot 52c opens rearwardly into the recess 32c and receives a projecting portion of the dowel pin 54c, generally as previously described.

The top jaw 16c is secured to the master jaw 14c by a single threaded retaining fastener 48c. The retaining fastener extends through a stepped fastener bore 40c formed in the top jaw and threadably engages the master jaw 14c, in the manner generally aforedescribed. Like the previously described retaining fasteners, the fastener 48c has an elongated shank which includes a frustoconical portion 50c generally adjacent its head and disposed within a reduced diameter portion of the fastener bore, the latter bore portion being indicated at 42c.

A resilient pin 46c which cooperates with the fastener 48c is received within a pin bore 44c which intersects the bore portion 42c. Like the previously described resilient pins, the resilient pin 46c preferably comprises a cylindrical roll pin. However, the roll pin 46c is arranged with its longitudinal axis disposed within an axial plane of the retaining fastener 48c. More specifically, the roll pin 46c is arranged with its longitudinal axis inclined to and extending transversely of the longitudinal axis of the fastener 48c. The angle of inclination of the roll pin 46c relative to the axis of the retaining fastener 48c is chosen so that a line of contact will be established between the generally cylindrical peripheral surface of the roll pin 46c and the frustoconical surface 50c on the shank of the retaining fastener 48c when the fastener is brought into contact with the roll pin confined within the intersecting roll pin bore 44c. As the retaining fastener 48c is tightened to fully seat the top jaw 16c on the master jaw 14c compressive force will be exerted upon the roll pin along its entire length. The energy stored within the compressed resilient roll pin provides a reactive resilient biasing force which acts upon the top jaw to urge the reference surface 38c on the top jaw into coengagement with the reference surface 28c on the master jaw. Thus, the retaining fastener 48c not only provides a quick connecting means for securing the top jaw to the master jaw but also cooperates with the roll pin 46c to exert a sustained biasing force of substantial magnitude on the top jaw to maintain the reference surfaces on the jaws in coengagement with each other. Thus, precise alignment of the top jaws with the master jaws on a chuck is attained to permit interchangability between the top jaws relative to the master jaws, as has been hereinbefore discussed.

Figure 16:
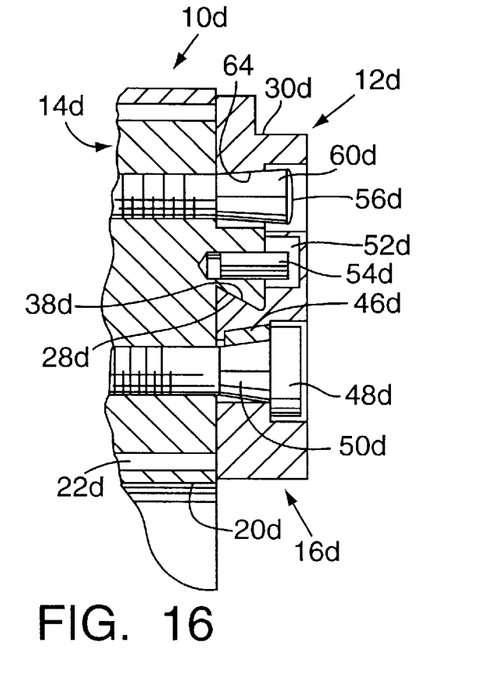
FIG. 16 is similar to FIG. 14 but shows still another embodiment of the invention.

In FIG. 16 there is shown still another chuck indicated at 10d and having a jaw assembly 12d which embodies the invention. The jaw assembly 12d includes a master jaw 14d and a top jaw 16d having a configuration resembling the pie slice shaped jaw 16c shown in FIG. 15. The top jaw 16d has a radially outwardly facing clamping surface 30d for clampingly engaging a workpiece at its I.D. As previously described the clamping surface 30d is machined on the jaw after the jaw has been mounted in the chuck.

Figure 17:
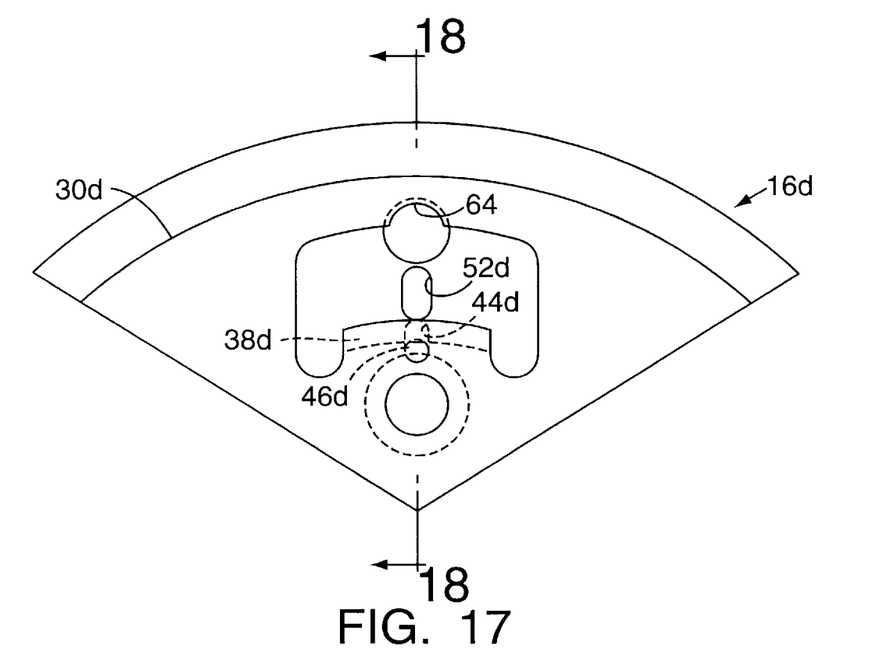
FIG. 17 is a rear elevational view of the top jaw shown in FIG. 16.
Figure 18:
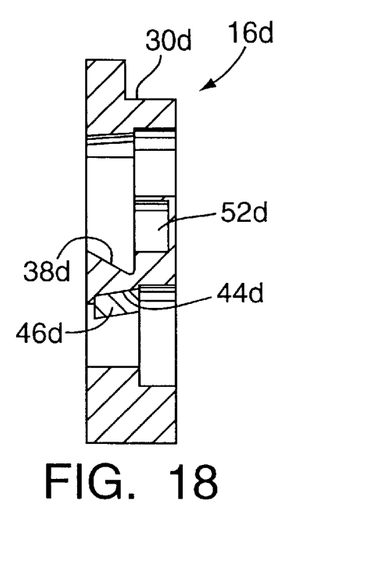
FIG. 18 is a sectional view taken along the line 18, 18 of FIG. 17.

As in the previously described embodiment shown in FIGS. 14 and 15, the jaw assembly 12d includes a single retaining fastener 48d and a dowel pin 54d adapted to be received within a slot 52d in the top jaw 16d, and best shown in FIGS. 17 and 18. A roll pin 46d is arranged with its axis disposed within an axial plane of the retaining fastener 48d, as previously described with reference to the jaw assembly 12c shown in FIGS. 14 and 15.

The jaw assembly 12d differs from the previously described jaw assembly 12c in that it includes a threaded locking member 56d for preventing relaxation of the resilient biasing force provided by the roll pin 46d when the jaw assembly is moved radially outwardly to bring the clamping surface 30d into clamping engagement with the I.D. of an associated workpiece. The locking member, or more specifically the frustoconical head portion 60d of the locking member directly engages a complementary conical surface 64 on the top jaw 16d best shown in FIG. 16.

After the top jaw 16d has been assembled on and positioned relative to the master jaw 14d the locking member 56d is adjusted to a set portion wherein the head portion 60d on the locking member is in direct abutting engagement with the complementary conical surface 64 on the top jaw 16d. Thus, the locking pin 56 cooperates with the top jaw 16b to prevent relaxation of the roll pin 46d, as previously discussed.

We claim:

1. A quick change jaw assembly comprising a pair of jaws including a master jaw and a top jaw, coengaging reference surfaces defined by said jaws, and retaining means for releasably securing said jaws in assembled relation to each other and continuously exerting resilient biasing force on one of said jaws urging said references surfaces toward and into coengagement with each other including a retaining fastener having an axially elongated shank and an axially elongated resilient pin carried by one of said jaws and engaged with an associated portion of said shank.

2. A quick change jaw assembly as set forth in claim 1 wherein said jaw retaining fastener extends through a fastener bore defined by one of said jaws and threadably engages the other of said jaws and said resilient pin is disposed within a pin bore defined by said one of said jaws and intersecting said fastener bore.

3. A quick change jaw assembly as set forth in claim 2 wherein said associated portion of said shank comprises a frustoconical portion.

4. A quick change jaw assembly as set forth in claim 2 wherein said pin comprises a generally cylindrical roll pin.

5. A quick change jaw assembly as set forth in claim 2 wherein said pin extends in a transverse direction relative to the axis of said shank.

6. A quick change jaw assembly as set forth in claim 2 wherein the axis of said pin and the axis of said shank are disposed within a common plane.

7. A quick change jaw assembly as set forth in claim 6 wherein the axis of said pin is inclined relative to the axis of said shank and said pin engages said associated portion of said shank along a line of contact extending along substantially the entire length of said pin.

8. A quick change jaw assembly as set forth in claim 1 including jaw alignment means for maintaining said jaws in predetermined position of alignment with each other.

9. A quick change jaw assembly as set forth in claim 8 wherein said jaw alignment means comprises a slot in one of said jaws receiving a complementary portion of the other of said jaws therein.

10. A quick change jaw assembly as set forth in claim 8 wherein said jaw alignment means comprises a dowel pin carried by and projecting from one of said jaws and a slot in the other of said jaws receiving a projecting portion of said dowel pin therein.

11. A quick change jaw assembly as set forth in claim 1 including locking means for preventing relaxation of said resilient biasing force in response clamping force applied by said jaws to an associated workpiece.

12. A quick change jaw assembly as set forth in claim 11 wherein said locking means comprises a locking pin carried by one of said jaws and a locking member carried by the other of said jaws and disposed in bearing engagement with said locking pin.

13. A quick change jaw assembly as set forth in claim 12 wherein said locking member is threadably connected to said other of said jaw and has a frustoconical portion and said frustoconical portion is disposed in bearing engagement with said locking pin.

14. A quick change jaw assembly as set forth in claim 13 wherein said locking member has a head and said frustoconical portion is defined by said head.

15. A quick change jaw assembly as set forth in claim 11 wherein said locking means comprises a locking member carried by one of said jaws and bearing directly on the other of said jaws.

16. In a chuck including a chuck body having a central axis a pair of jaws including a master jaw supported on said chuck body for radial movement generally toward and away from said central axis and a top jaw carried by said master jaw, reference means for positioning said top jaw on and relative to said master jaw and including coengaging arcuate surfaces on said jaws, said arcuate surfaces having axes of revolution coincident with said axis of rotation, the improvement comprising retaining means for releasably securing said top jaw to said master jaw and continuously exerting resilient biasing force urging said arcuate reference surface on said top jaw member toward and into coengagement with said arcuate reference surface on said master jaw and including a single threaded retaining fastener passing through a fastener bore in said top jaw and threadably engaged with said master jaw and a resilient axially elongated pin carried by said top jaw and engaging said threaded fastener in radially offset relation to the axis of said threaded fastener.

17. In a chuck as set forth in claim 16 the further improvement wherein said resilient pin is supported within a pin bore defined by said top jaw and intersecting said fastener bore.

18. In a chuck as set forth in claim 16 the further improvement wherein said pin is further characterized as a generally cylindrical roll pin.

19. In a chuck as set forth in claim 16 the further improvement wherein said threaded fastener has an axially elongated shank including a frustoconical portion and said pin engages said frustoconical portion within said fastener bore.

20. In a chuck as set forth in claim 16 the further improvement wherein said pin is disposed with its longitudinal axis extending in a transverse direction relative to the axis of said retaining fastener.

21. In a chuck as set forth in claim 16 the further improvement wherein said longitudinal axis of said pin and said axis of said retaining fastener are disposed within a common plane.

22. In a chuck as set forth in claim 20 the further improvement wherein said axis of said pin is inclined relative to said axis of retaining fastener.

23. In a chuck as set forth in claim 16 the further improvement wherein said arcuate reference surfaces are defined by conical surfaces of revolution.

24. In a chuck as set forth in claim 16 the further improvement wherein said arcuate reference surfaces are defined by cylindrical surfaces of revolution.

25. In a chuck as set forth in claim 16 the further improvement including alignment means for maintaining said top jaw in a predetermined position of alignment with said master jaw.

26. In a chuck as set forth in claim 25 the further improvement wherein said alignment means includes a slot formed in one of said jaws receiving an associated complementary portion of the other of said jaws therein.

27. In a chuck as set forth in claim 24 the further improvement wherein said alignment means comprises a dowel pin carried by and projecting from one of said jaws and a slot in the other of said jaws receiving a projecting portion of said dowel pin therein.

28. In a chuck as set forth in claim 16 the further improvement including locking means for preventing relaxation of said resilient biasing force in response clamping force applied by said jaws to an associated workpiece.

29. In a chuck as set forth in claim 28 the further improvement wherein said locking means comprises a locking pin carried by one of said jaws and a locking member carried by the other of said jaws and disposed in bearing engagement with said locking pin.

30. In a chuck as set forth in claim 29 the further improvement wherein said locking member has a frustoconical portion and said frustoconical portion is disposed in bearing engagement with said locking pin.

31. In a chuck as set forth in claim 30 the further improvement wherein said locking member has a head and said frustoconical portion is defined by said head.

32. In a chuck as set forth in claim 29 the further improvement wherein said locking means comprises a locking member carried by one of said jaws and bearing directly on the other of said jaw.

* * * * *